Figure 1:
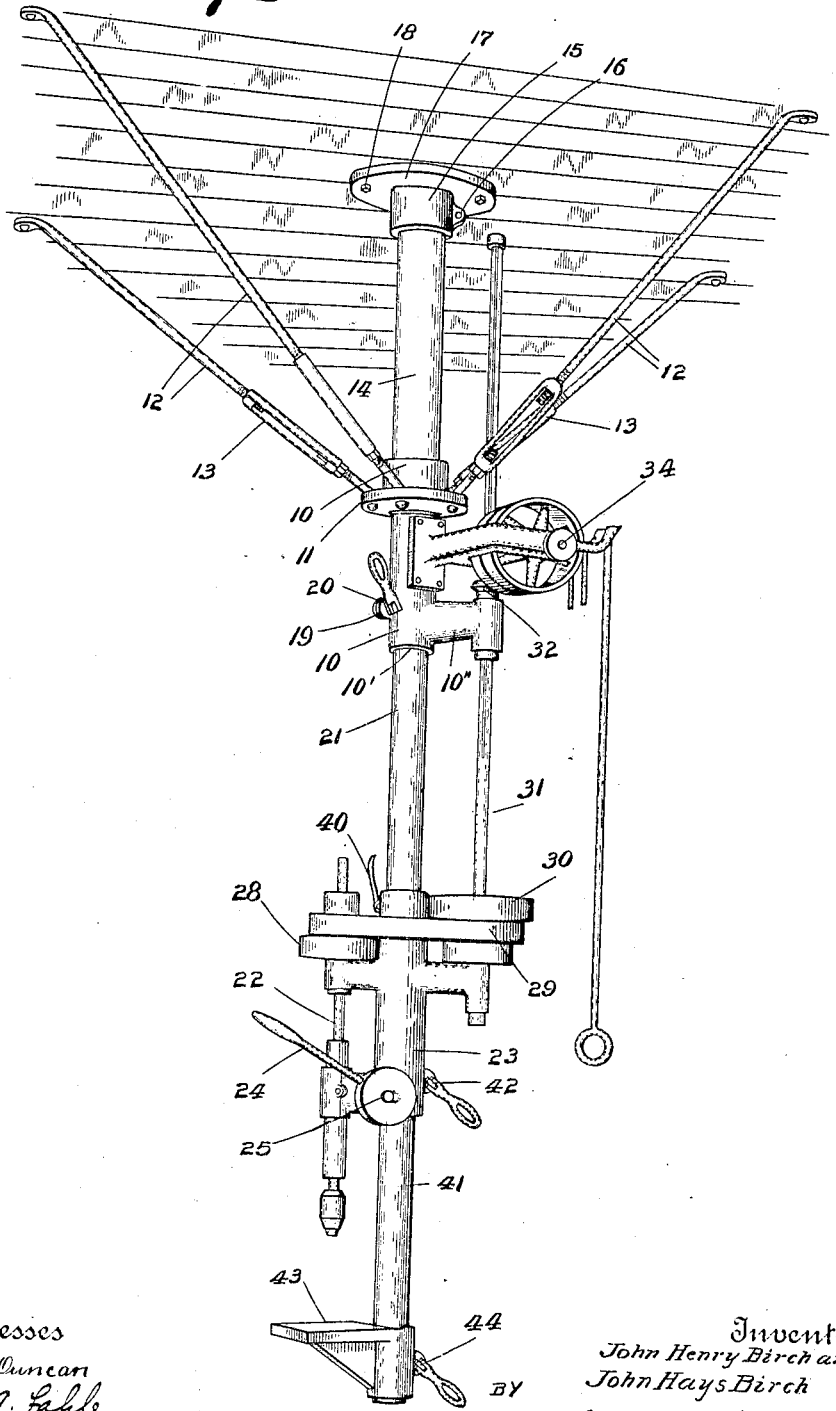

No. 857,020. PATENTED JUNE 18, 1907.
JOHN HENRY BIRCH & JOHN HAYS BIRCH.
SUSPENDED DRILL PRESS.
APPLICATION FILED SEPT. 29, 1906.

2 SHEETS—SHEET 1.

Witnesses
Fred A. Duncan
Frank A. Fahle

Inventors
John Henry Birch and
John Hays Birch
BY
Bradford & Hood
Attorneys

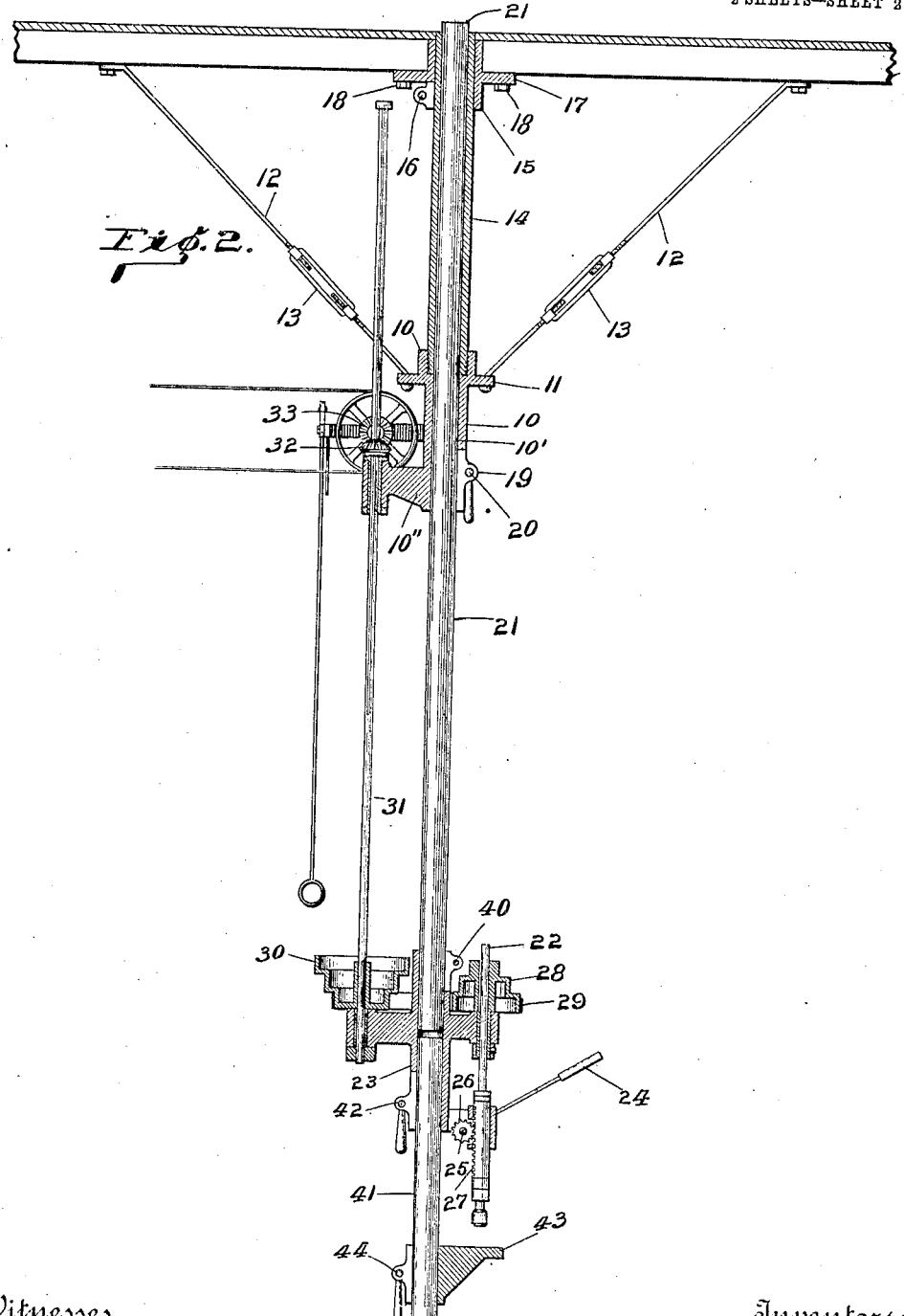

UNITED STATES PATENT OFFICE.

JOHN HENRY BIRCH AND JOHN HAYS BIRCH, OF CRAWFORDSVILLE, INDIANA.

SUSPENDED DRILL-PRESS.

No. 857,020.             Specification of Letters Patent.             Patented June 18, 1907.

Application filed September 29, 1906. Serial No. 336,688.

*To all whom it may concern:*

Be it known that we, JOHN HENRY BIRCH and JOHN HAYS BIRCH, citizens of the United States, residing at Crawfordsville, in the county of Montgomery and State of Indiana, have invented certain new and useful Improvements in Suspended Drill-Presses, of which the following is a specification.

The object of our invention is to produce a drill press capable of handling any ordinary run of work, and also capable of operating upon the middles of large articles the size of which is materially greater than the distance between the drill spindle and the support of the usual work table.

To this end we have produced a drill press which, instead of being supported upon the floor in the usual manner, is suspended rigidly from a ceiling, the construction being such that the drill spindle bracket may be readily adjusted in height from the floor and the work table may be readily removed.

The accompanying drawings illustrate our invention.

Figure 1 is a perspective view of an apparatus embodying our invention; and Fig. 2 a vertical section.

In the drawings, 10 indicates a head provided with a horizontal flange 11 to which are secured several brace rods 12, each consisting in part of a turnbuckle 13 by means of which the length may be readily adjusted. Secured in head 10 is a sleeve 14 which extends upwardly to or through the ceiling to which the device is to be secured and sleeved upon sleeve 14 is a thimble 15 which is split and provided with a clamping screw 16 in order that it may be first adjusted and then clamped securely upon sleeve 14. Thimble 15 is provided with a horizontal flange 17 through which bolts 18 may be passed into the ceiling. The lower end of head 10 is provided with a vertical bore 10' the diameter of which is slightly less than the internal diameter of tube 14 and is split vertically and provided at each side of the split with ears 19, which are adapted to be clamped together by a clamping screw 20. Fitted in bore 10' is a main stem 21 of considerable length, said stem passing upward through head 10 and tube 14.

The drill spindle 22 is journaled in a head 23 and is axially adjustable therethrough in the usual well known manner by means of lever 24, shaft 25, gear 26 and rack 27.

Splined upon spindle 22 and journaled in head 23 is a driving cone 28 connected by belt 29 with a driving cone 30 carried by a shaft 31 journaled in head 23, said shaft projecting upwardly through the hub of a gear 32 which is journaled in an extension 10'' of head 10. The shaft 31 is splined in the gear 32 and is axially reciprocable therethrough. Gear 32 meshes with a gear 33 carried by a counter-shaft 34. The head 23 and stem 21 may be permanently connected or, as more convenient for manufacture, shipping, etc., the head 23 may be split at its upper end and clamped upon the lower end of stem 21 by means of a suitable clamping screw 40. Stem 21 extends into head 23 about half the length thereof and the lower end of said head is adapted to receive a stem 41 which is clamped into the head by means of a suitable clamping screw 42, which serves to clamp the lower split end of head 23 upon the stem 41. Vertically adjustable upon stem 41 is a work table 43 held in any desired position of vertical adjustment by clamping screw 44 which serves to draw the split sleeve of head 43 tightly upon the stem 41.

In erecting the apparatus the outer ends of brace rods 12 are secured to the ceiling and the upper end of tube 13 is passed loosely into or through the ceiling. The brace rods 12 are then adjustable in length so as to hold the tube 14 vertically and thimble 15 is secured to the ceiling and clamped tightly upon tube 14, whereupon the turnbuckles 13 are set up tight so as to hold the structure rigidly. Any desired vertical height, beyond the mere vertical drill movement of the drill spindle, may be attained by loosening clamping screw 20 and vertically adjusted stem 21 in head 10, the shaft 31 moving axially through gear 32. Vertical adjustment of small articles may be obtained by vertical adjustment of the work table 43. When it is desired to operate upon articles too large to be placed upon the work table, said work table and the stem 41, which supports the same, are quickly removed by loosening clamping screw 42, whereupon large work resting upon the floor may be placed at any desired position beneath the drill spindle.

It will thus be seen that we are able to operate upon large articles with a very light drill press structure, in view of the fact that the over-hang of the drill spindle from the supporting member is very small.

We claim as our invention:

1. A suspended drill press comprising a main head and means for suspending the same, a drill-spindle head, means for supporting said drill spindle head from the main head and permitting vertical adjustment of the drill-spindle head relative to the main head, means for retaining the same in any desired position of adjustment, and a work table detachably secured to said drill-spindle head.

2. A suspended drill press comprising a main head and means for suspending the same, a drill-spindle head, means for supporting said drill spindle head from the main head permitting vertical adjustment of the drill-spindle head relative to the main head, means for retaining the same in any desired position of adjustment, a work table support detachably secured to said drill-spindle head, a work table carried by said support and means for vertically adjusting the work table.

3. A suspended drill press comprising a main tubular head, means for securing the same to an overhead support, a stem mounted in said tubular head and vertically adjustable in said head, means for holding said main stem in any desired position of vertical adjustment, a spindle head carried by said main stem, a drill spindle journaled in the spindle head, and driving means for said drill spindle operable in any vertical position of adjustment of the main stem.

4. A suspended drill press comprising a main tubular head, means for securing the same to an overhead support, a main stem mounted in said tubular head and vertically adjustable in said tubular head, means for holding said main stem in any desired position of vertical adjustment, a spindle head carried by said main stem, a drill spindle journaled in the spindle head, driving means for said drill spindle operable in any vertical position of adjustment of the main stem, a work table stem detachably secured in the spindle head, and a work table carried by said table stem.

In witness whereof, we have hereunto set our hands and seals at Crawfordsville, Indiana, this 27th day of September, A. D. one thousand nine hundred and six

JOHN HENRY BIRCH. [L. S.]
  JOHN HAYS BIRCH. [L. S.]

Witnesses:
  ROBERT H. WILLIAMS,
  LOUISE MCPHEETERS.